United States Patent [19]

Terada et al.

[11] Patent Number: 5,460,749
[45] Date of Patent: Oct. 24, 1995

[54] LIQUID CRYSTAL DEVICE AND LIQUID CRYSTAL DISPLAY APPARATUS

[75] Inventors: Masahiro Terada; Syuji Yamada, both of Atsugi; Hiroshi Mizuno, Zama, all of Japan

[73] Assignee: Canon Kabushiki Kaisha, Tokyo, Japan

[21] Appl. No.: 172,164

[22] Filed: Dec. 23, 1993

[30] Foreign Application Priority Data

Dec. 25, 1992 [JP] Japan ................... 4-357907

[51] Int. Cl.$^6$ .............................. C09K 19/34; G02F 1/13
[52] U.S. Cl. ................... 252/299.61; 359/56; 359/104
[58] Field of Search .................. 252/299.61; 359/56, 359/104

[56] References Cited

U.S. PATENT DOCUMENTS

| | | | |
|---|---|---|---|
| 4,367,924 | 1/1983 | Clark et al. | 359/56 X |
| 4,674,839 | 6/1987 | Tsuboyama et al. | 359/82 X |
| 4,932,758 | 6/1990 | Hanyu et al. | 359/100 X |
| 5,013,137 | 5/1991 | Tsuboyama et al. | 359/56 X |
| 5,026,144 | 6/1991 | Taniguchi et al. | 359/56 X |
| 5,200,848 | 4/1993 | Hanyu et al. | 359/100 |
| 5,223,963 | 6/1993 | Okada et al. | 359/78 |
| 5,293,544 | 3/1994 | Hanyu et al. | 359/78 |
| 5,305,131 | 4/1994 | Terada et al. | 359/104 |
| 5,325,219 | 6/1994 | Hanyu et al. | 359/78 |

FOREIGN PATENT DOCUMENTS

| | | |
|---|---|---|
| 0307959 | 3/1989 | European Pat. Off. |
| 0444705 | 9/1991 | European Pat. Off. |
| 0455160 | 11/1991 | European Pat. Off. |
| 0548548 | 6/1993 | European Pat. Off. |
| 193426 | 11/1984 | Japan |
| 193427 | 11/1984 | Japan |
| 31120 | 2/1985 | Japan |
| 156046 | 8/1985 | Japan |
| 156047 | 8/1985 | Japan |
| 140198 | 6/1989 | Japan |

OTHER PUBLICATIONS

Fujitsu Sci. & Tech. Journal 27, No. 3 (1991) 233:42.
Nakano et al., Jpn. J. Appl. Phys., vol. 19, No. 10 (1980) 2013–4.
Ouchi et al., Jpn. J. Appl. Phys., vol. 27, No. 5, (1988) 725–8.

*Primary Examiner*—Cynthia Harris
*Attorney, Agent, or Firm*—Fitzpatrick, Cella, Harper & Scinto

[57] ABSTRACT

A liquid crystal device is constituted by disposing a chiral smectic liquid crystal between a pair of substrates each provided with an electrode and a uniaxial alignment film. The chiral smectic liquid crystal is placed in such a quasi-smectic A alignment state that the liquid crystal molecules will have a single average molecular axis under no electric field application on a lower temperature side within chiral smectic C phase range, wherein the single average molecular axis can be confirmed as a position providing the darkest state when observed through cross nicol polarizers. Such a quasi-smectic A alignment state is effective in providing a liquid crystal device (or display apparatus) having an improved shock resistance and a good low-temperature storage properties.

11 Claims, 7 Drawing Sheets

C1 ALIGNMENT  $\text{H} + \delta > \alpha$

C2 ALIGNMENT  $\text{H} - \delta > \alpha$

LIQUID CRYSTAL DEVICE AND LIQUID CRYSTAL DISPLAY APPARATUS

FIELD OF THE INVENTION AND RELATED ART

This invention relates to a liquid crystal device to be used in a liquid crystal display device or a liquid crystal-optical shutter, etc., particularly a liquid crystal device using of a ferroelectric liquid crystal, and a liquid crystal display apparatus using the liquid crystal device.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC, or SmH* phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

Generally, in a liquid crystal device utilizing birefringence of a liquid crystal, the transmittance under right angle cross nicols is given by the following equation:

$$I/I_0 = \sin^2 4\theta a \cdot \sin^2(\Delta nd/\lambda)\pi,$$

wherein $I_0$: incident light intensity, $I$: transmitted light intensity, $\theta a$: apparent tilt angle, $\Delta n$: refractive index anisotropy, $d$: thickness of the liquid crystal layer, $\lambda$: wavelength of the incident light.

The apparent tilt angle $\theta a$ in the above-mentioned non-helical structure is recognized as a half of an angle between the average molecular axis directions of liquid crystal molecules in a twisted alignment in a first orientation state and a second orientation state. According to the above equation, it is shown that an apparent tilt angle $\theta a$ of 22.5 degrees provides a maximum transmittance and the apparent tilt angle $\theta a$ in a non-helical structure for realizing bistability should desirably be as close as possible to 22.5 degrees in order to provide a high transmittance and a high contrast.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, it has been found that an apparent tilt angle $\theta a$ (a half of an angle formed between molecular axes at two stable states) in a ferroelectric liquid crystal with a non-helical structure obtained by alignment with an alignment control film of the prior art has become smaller as compared with a a cone angle Ⓗ (the angle Ⓗ is a half of the apex angle of the cone shown in FIG. 3A as described below) in the ferroelectric liquid crystal having a helical structure. Particularly, the apparent tilt angle $\theta a$ in a ferroelectric liquid crystal with a non-helical structure obtained by alignment with alignment control films of the prior art was found to be generally on the order of 3–8 degrees, and the transmittance at that time was at most about 3 to 5%.

In order to realize a display device comprising a chiral smectic liquid crystal disposed to have a large apparent tilt angle $\theta a$ in a non-helical structure and capable of displaying a high contrast image, there has been discovered the following.

That is, it has been clarified that it is possible to realize a display providing a high contrast image by using a liquid crystal device, comprising: a pair of substrates, and a chiral smectic liquid crystal disposed between the substrates, each of the facing surfaces of substrates having thereon an electrode for applying a voltage to the liquid crystal and a uniaxial alignment film for aligning the liquid crystal; wherein the alignment films on the substrates are provided with uniaxial alignment axes which cross each other at a prescribed angle and the chiral smectic liquid crystal is disposed in such an alignment state that the liquid crystal shows a pretilt angle $\alpha$, a cone angle Ⓗ, and an inclination angle $\delta$ of the liquid crystal layer (i.e., an angle formed by the liquid crystal layer line and a normal to the substrate) satisfying relationships of:

$$Ⓗ < \alpha + \delta \text{ and } \delta < \alpha,$$

and such an alignment state includes at least two stable states in which an apparent tilt angle $\theta a$ and the cone angle Ⓗ satisfies a relationship of:

$$Ⓗ > \theta a > Ⓗ/2.$$

More specifically, a smectic liquid crystal generally has a layer structure and, due to a shrinkage of spacing between layers when it causes a transition from smectic A phase (SmA) to chiral smectic C phase (SmC*), it assumes a chevron structure as shown in FIG. 2 where the layers 21 are bent at a mid point between a pair of substrates 24a and 24b.

There are two alignment states depending on the bending directions as shown in FIG. 2, including a C1 alignment state 22 appearing immediately after transition from a higher temperature phase to SmC* phase and a C2 alignment state 23 which appears in mixture with the C2 alignment state on further cooling. It have been further discovered (1) that the above C1 C2 transition does not readily occur when a specific combination of an alignment film providing a high pretilt angle a and a liquid crystal is used, and the C2 alignment state does not occur at all when a specific liquid crystal is used, and (2) that, in C1 alignment state, two stable states providing a high contrast (hereinafter inclusively called "uniform state") are formed in addition to hitherto-found two stable states providing low contrast (hereinafter inclusively called "splay state") wherein liquid crystal directors are twisted between the substrates.

These states can be transformed from one to the other by applying a certain electric field. More specifically, transition between two splay states is caused under application of weak positive and negative pulse electric fields, and transition between two uniform states is caused under application of strong positive and negative pulse electric fields. By using the two uniform states, it is possible to realize a display device which is brighter and shows a higher contrast than the conventional devices. Accordingly, it is expected that a display with a higher quality can be realized by using a display device wherein the entire display area is formed in C1 alignment state and the high contrast two states in the C1 alignment state are used as two states representing white and black display states.

In order to realize C1 alignment state without yielding C2 alignment state as described above, the following conditions are required.

Referring to FIGS. 3A and 3B, directions in the vicinity of the substrates in the C1 alignment and C2 alignment are disposed on cones 31 shown in FIGS. 3A and 3B, respectively. As is well known, as a result of rubbing, liquid crystal molecules contacting a substrate surface form a pretilt angle a, the direction of which is such that the liquid crystal molecules 32 raise a forward end up (i.e., spaced from the substrate surface) in the direction of the rubbing indicated by an arrow $\underline{A}$ (as shown also in FIG. 2). From the above, it is required that the following relationships are satisfied among a cone angle $\widehat{H}$, the pretilt angle $\alpha$ and a layer inclination angle $\delta$;

$\widehat{H}+\delta>\alpha$ in C1 alignment, and $\widehat{H}-\delta>\alpha$ in C2 alignment.

Accordingly, the condition for preventing the formation of C2 alignment but allowing C1 alignment is $\widehat{H}-\delta<\alpha$, that is $$H<\alpha+\delta \qquad (I).$$

Further, from simple consideration of a torque acting on a liquid crystal molecule at a boundary surface in switching from one position to the other position under an electric field, the relationship of $\alpha>\delta$ ... (II) is given as a condition for easy switching of such a liquid crystal molecule at the boundary.

Accordingly, in order to form the C1 alignment more stably, it is effective to satisfy the condition (II) in addition to the condition (I).

From further experiments under the conditions of (I) and (II), the apparent tilt angle $\theta a$ is increased from 3–8 degrees obtained when the conditions (I) and (II) are not satisfied to 8–16 degrees when the conditions (I) and (II) are satisfied according to the present invention, and also an empirical relationship of $\widehat{H}>\theta a>\widehat{H}/2$ ... (III) has been also found.

As described above, it has been clarified that the satisfaction of the conditions (I), (II) and (III) provides a display device capable of displaying a high-contrast image.

In order to stably form the C1 alignment state and also provide a good alignment characteristic, it is also very effective to perform cross-rubbing, that is, rubbing a pair of substrates in directions intersecting at an angle of 1–25 degrees while the directions A are shown generally parallel in FIG. 2.

Incidentally, a display apparatus using a chiral smectic liquid crystal can realize a large screen and a high resolution which by far exceed those attained by conventional CRT and TN-type liquid crystal displays. However, as the screen size and resolution are increased, the frame frequency (frequency constituting one picture) becomes low. This leads to a problem that the picture-rewriting speed becomes slow and the motion picture display becomes slow, e.g., in cases of smooth scrolling and cursor movement on a graphic screen. A solution to this problem has been given in, e.g., JP-A 60-31120 and JP-A 1-140198.

More specifically, there has been disclosed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

As described above, it has become clear that it is possible to realize a large-area and high-resolution display which can display high-contrast images at a high speed by incorporating a liquid crystal device satisfying the conditions (I), (II) and (III) in the above-described display apparatus capable of performing the partial writing.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including an operable temperature range, temperature-dependence of response speed, low-temperature storage properties, impact or shock resistance, etc. in some cases.

Generally, a ferroelectric liquid crystal has a clear layer structure at a temperature range where the ferroelectric liquid crystal is used, thus showing a poor flowability compared with a nematic liquid crystal. Accordingly, the ferroelectric liquid crystal has a relatively poor brittleness against an external stress such as a force of shock or strain and thus causes a zigzag defect comprising C1 alignment and C2 alignment for a slight shock. For a great shock, the ferroelectric liquid crystal causes a disorder of its layer structure per se, thus resulting in, e.g., a sanded texture as disclosed in U.S. Pat. No. 4,674,839 by Tsuboyama et al. In general, a shock (or impact) resistance is liable to become worse at a low temperature where a viscosity of a liquid crystal is increased to provide a poor flowability, resulting in a serious problem in the case of transportation by aircraft etc. A lower limit temperature to chiral smectic C phase, i.e., a phase transition temperature (Mp) to another mesomorphic phase or crystal phase is an essential factor for determining low-temperature storage properties. At this stage, it is difficult to decrease an Mp of a liquid crystal composition, having overall excellent characteristics including a high contrast and a decreased temperature-dependence of a response speed providing a high quality image in a wide temperature range including room temperature, to a sufficiently low temperature region (e.g., below $-20°$ C.).

SUMMARY OF THE INVENTION

An object of the present invention is to provide a liquid crystal device having a good shock resistance particularly at low temperature and a liquid crystal display apparatus using the liquid crystal device.

Another object of the present invention is to provide a liquid crystal device having an excellent low temperature storage properties and a liquid crystal display apparatus using the liquid crystal device.

As a result of our research, we have found that it is possible to improve a shock resistance and low temperature storage properties by a chiral smectic liquid crystal capable of providing a specific alignment state at a lower temperature side of chiral smectic C phase range.

That is, according to the present invention, there is provided a liquid crystal device, comprising: a pair of substrates and a chiral smectic liquid crystal disposed between the pair of substrates, each of the pair of substrates having thereon an electrode for applying a voltage to the liquid crystal, the pair of substrates being provided with respective uniaxial alignment axes extending in directions which are parallel to each other or intersect each other at a prescribed angle, wherein the chiral smectic liquid crystal is placed in such an alignment state that the liquid crystal molecules will have a single average molecular axis under no electric field application on a lower temperature side within chiral smectic C phase range, wherein the single average molecular axis can be confirmed as a position providing the darkest state when observed through cross nicol polarizers.

According to the present invention, there is further provided a liquid crystal display apparatus comprising the above liquid crystal device, a drive circuit for driving the liquid crystal device and a light source.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
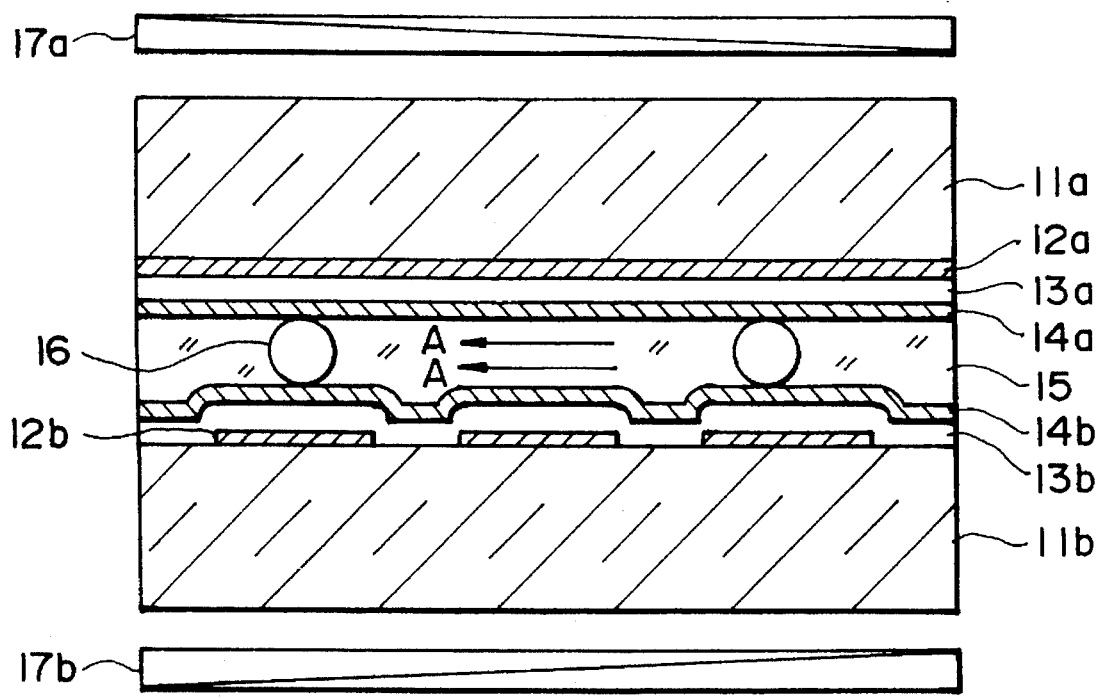
FIG. 1 is a schematic sectional view of an embodiment of the liquid crystal device according to the present invention.
Figure 2:
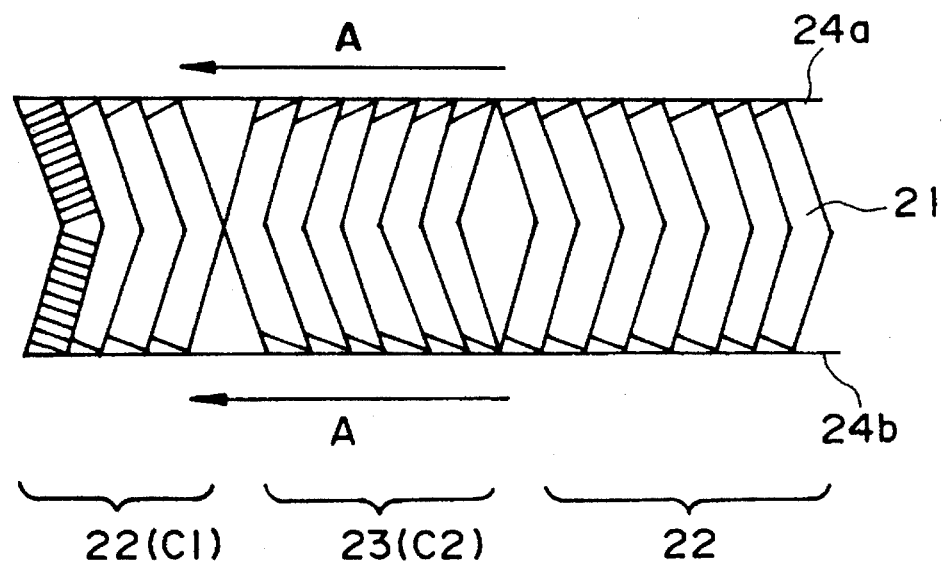
FIG. 2 is an illustration of C1 and C2 alignment states.
Figure 3A:
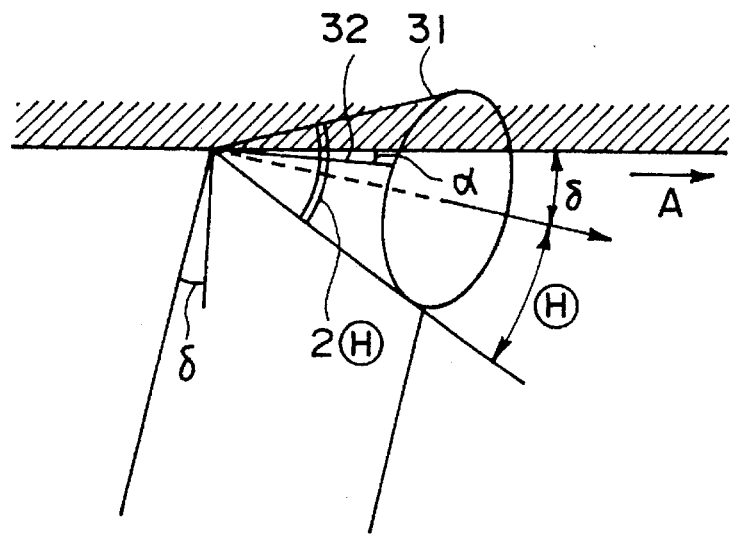
FIGS. 3A and 3B are illustrations of relationship among a cone angle, a pretilt angle and a layer inclination angle in C1 alignment and C2 alignment, respectively.
Figure 3B:
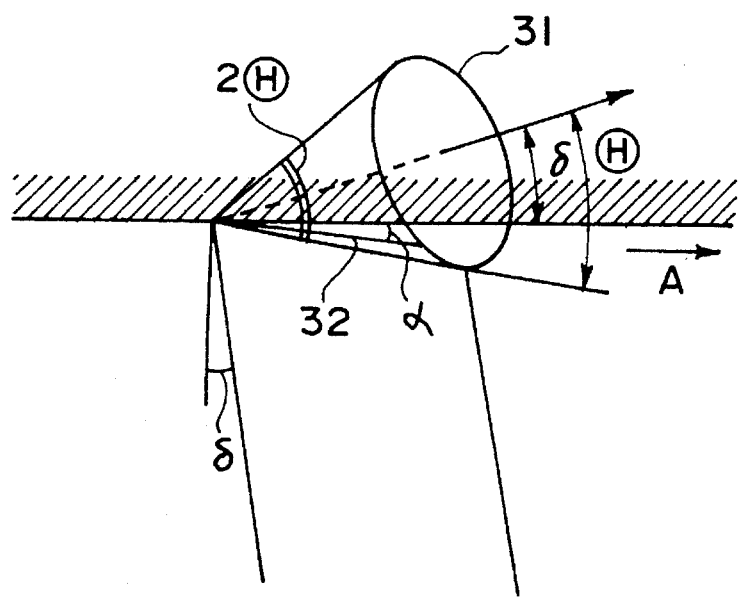

The liquid crystal device according to the present invention is characterized by a chiral smectic liquid crystal capable of providing the above-mentioned specific alignment state on a lower temperature side within chiral smectic C phase.

Hereinbelow, such a specific alignment state described above is referred to as "quasi-smectic A alignment state or quasi-$S_A$ state". A quasi-smectic A alignment state is identified by an alignment state providing a single average molecular axis which can be confirmed as a position providing the darkest state when observed through cross nicol polarizers under no electric field application. The single average molecular axis extends in substantially the same direction as a central axis direction with respect to the uniaxial alignment axes in the above observation. Herein, a temperature providing such a single average molecular axis on temperature decrease is referred to as "quasi-$S_A$ state appearing temperature".

In another respect, the liquid crystal device according to the present invention comprises a chiral smectic liquid crystal capable of providing a quasi-smectic A alignment state which appears at a temperature range lower than a temperature range where the chiral smectic liquid crystal assumes different two alignment states under no electric field application.

In order to realize a high contrast, the liquid crystal device according to the present invention may preferably include a chiral smectic liquid crystal being placed in such an alignment state that the liquid crystal assumes at least two stable states and provides a pretilt angle $\alpha$, a cone angle $Ⓗ$, an inclination angle $\delta$ of the liquid crystal layer, and an apparent tilt angle $\theta a$ each in the neighborhood of room temperature satisfying the following relationships (1) and (2):

$$Ⓗ < \alpha + \delta \text{ and } \delta < \alpha \qquad (1),$$

$$Ⓗ > \theta a > Ⓗ/2 \qquad (2).$$

In a preferred embodiment for stably forming C1 alignment state and a good alignment characteristic, the liquid crystal device of the present invention may preferably have respective uniaxial alignment axes extending in directions which intersect each other at an angle of 1–25 degrees.

In order to improve a uniform alignment characteristic, the liquid crystal device of the present invention may preferably comprise the chiral smectic liquid crystal being further placed in such an alignment state that the liquid crystal molecules will have a single average molecular axis under no electric field application in the neighborhood of the upper limit temperature within chiral smectic C phase range, wherein the single average molecular axis can be confirmed as a position providing the darkest state when observed through cross nicol polarizers (Hereinbelow, such an alignment state is referred to as "another quasi-smectic A phase").

The chiral smectic liquid crystal used in the present invention may preferably provide a pretilt angle $\alpha$ of at least 5 degrees.

For a usable property effective in improving a uniform alignment characteristic, the chiral smectic liquid crystal may preferably have a temperature characteristic of an inclination angle $\delta$ such that the inclination angle $\delta$ increases on temperature decrease down to a mediate temperature as a temperature giving a maximum of inclination angle $\delta$ and decreases on further temperature decrease below the mediate temperature. In the present invention, the mediate temperature may preferably appear at a temperature of at least 10° C., more preferably at least 25° C., in order to effectively improve a temperature-dependence of driving characteristics of the liquid crystal device at around room temperature.

In order to advantageously place chiral smectic liquid crystal in a quasi-smectic A alignment state, we have empirically found the following tendencies.

The chiral smectic liquid crystal may preferably have a relatively small inclination angle $\delta$ providing a layer structure closer to a bookshelf state. At this time, the liquid crystal shows a cone angle $Ⓗ$ smaller than one at room temperature in many cases. However, the quasi-smectic A alignment state appears at various temperature ranges depending upon a difference in, e.g., alignment treatment even when the same chiral smectic liquid crystal is used. Generally speaking, when a pretilt angle $\alpha$ is large, the quasi-smectic A alignment state is liable to appear at a relatively higher temperature on a low temperature side within Sc* (chiral smectic C phase) range. When the quasi-$S_A$ state starts to appear, a value of the inclination angle $\delta$ is changed depending upon values of pretilt angle $\alpha$, cone angle $Ⓗ$, viscosity, etc. The value of the inclination angle $\delta$ cannot not be referred to as an accurate numerical value but is about 6 degrees or below as an empirical value.

On the other hand, in a case where a pretilt angle is relatively large and a chiral smectic liquid crystal assumes C1 uniform alignment state satisfying the above-mentioned relationships (1) and (2), the chiral smectic liquid crystal is placed in another quasi-smectic A alignment state at the neighborhood of the upper limit temperature of Sc* in many cases. At visual observation, "quasi-smectic A alignment state" and "another quasi-smectic A alignment state" cannot be distinguished from each other. However, the two alignment states can be distinguished by, e.g., measurement of cone angle Ⓗ at switching of the chiral smectic liquid crystal under electric field application. More specifically, "another quasi-smectic A alignment state" cannot be said to a state showing a memory characteristic because the liquid crystal molecules in one stable state are moved to align along a center axis direction of the uniaxial alignment axes at a velocity on the order of several milli-seconds. On the other hand, "quasi-smectic A alignment state" can be said to a state showing a memory characteristic during a certain time because the movement of the liquid crystal molecules as described above is caused to occur at a velocity on the order of 0.1 second to several tens of seconds. Such a movement that liquid crystal molecules switched (or oriented) to one stable state (i.e., a state where a cone angle Ⓗ is formed by the optical axis direction in one stable state and the center axis direction of the uniaxial alignment axes) by electric field application is successively caused to occur in the smectic layer formation direction (i.e., a direction perpendicular to the center axis direction of the alignment control axes).

The "quasi-smectic A alignment state" provides a liquid crystal device with an improved shock resistance and a stable alignment state causing no disorder of alignment caused by crystallization. This reason may be attributable to results obtained from X-ray diffraction experiment as follows.

Figure 8:
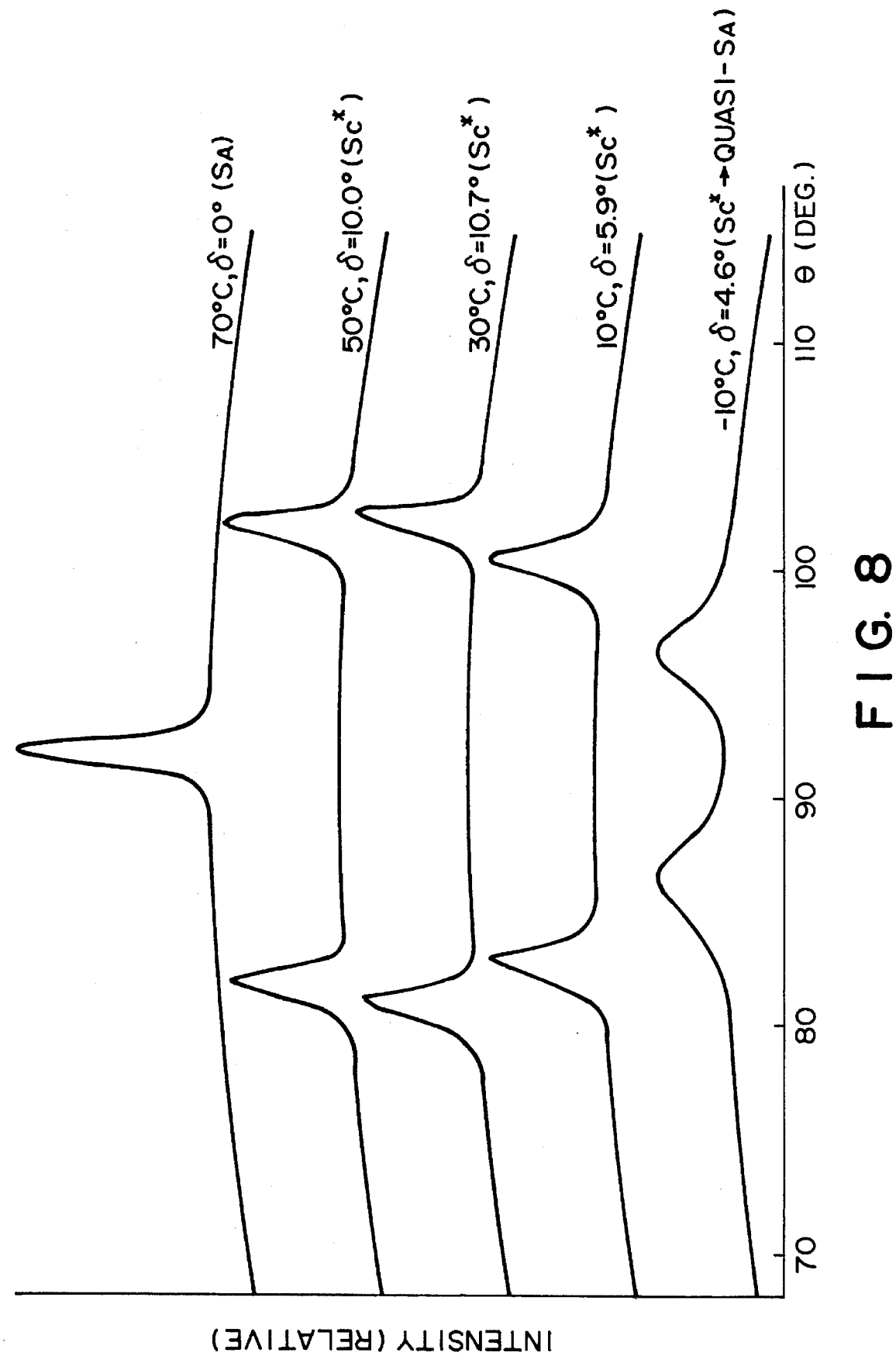
FIG. 8 is a graph of at some temperatures illustrating a charge of a layer structure.

FIG. 8 shows a graph of X-ray diffraction patterns of a liquid crystal composition (Composition D used in Example 2-5 appearing hereinafter) constituting a liquid crystal cell (cell gap: 1.2 μm, alignment film: "LQ-1802") for illustrating a change of layer structure at various temperatures (−10° C., 10° C., 30° C., 50° C. and 70° C.). Each X-ray diffraction pattern is obtained by scanning with respect to θ axis on condition that an angle of 2θ is fixed at 3 degrees (corresponding to a layer spacing of 300 nm in Bragg condition). Referring to FIG. 8, the sharp peaks (at 10° C. to 50° C.) on the diffraction patterns, shows a longer correlation length (i.e., a longer orderly (or constant) layer distance) of the layer structure and the broad peaks (at −10° C.) shows a shorter correlation length (i.e., a shorter orderly layer distance) of the layer structure. That is, the peak shape in Sc*→quasi-$S_A$ phase transition at −10° C. is broader than that in Sc* at 10° to 50° C. This reason is not clarified as yet but may be mainly attributable to an improvement in a flexibility of the layer structure in Sc*→quasi-$S_A$ phase transition. Such a layer structure in quasi-$S_A$ phase is presumably effective for absorbing an external shock.

According to a study of our research group, a value and a temperature dependence of a layer inclination angle δ of a liquid crystal layer can be changed by controlling factors of liquid crystal compounds contained therein, such as a skeleton structure, side chain lengths and an affinity of combination. In many cases, a type of a liquid crystal tending to provide a broader smectic A temperature range changes considerably the temperature dependence of δ.

A preferred embodiment of the liquid crystal device will now be described with reference to FIG. 1 which is a schematic sectional view of the device. Referring to FIG. 1, the device includes a pair of substrates (glass plates) 11a and 11b coated with transparent electrodes 12a and 12b, respectively, of $In_2O_3$, ITO (indium tin oxide), etc., then with 200 to 3000 Å-thick insulating films 13a and 13b, respectively, of $SiO_2$, $TiO_2$, $Ta_2O_5$, etc., and further with 50 to 1000 Å-thick polyimide alignment films 14a and 14b formed, e.g., by applying and baking a polyamide acid represented by the following formula:

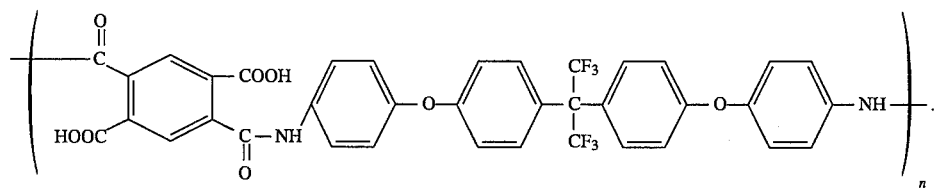

The alignment films 14a and 14b are respectively provided with uniaxial alignment axes by rubbing in directions (denoted by arrows A in FIG. 1) which are generally parallel and in the same direction but intersect each other at a clockwise or counter-clockwise angle of 0–25 degrees. The direction of clockwise (or counter-clockwise) intersection angle is determined herein by the direction of rotation of the alignment axis provided to the upper alignment film 14a from the alignment axis provided to the lower alignment film 14b as viewed from the upper substrate 11a.

Between the substrates 11a and 11b is disposed a chiral smectic C liquid crystal 15, and the spacing between the substrates 11a and 11b is set to a value (e.g., 0.1–3 μm) which is sufficiently small to suppress the formation of a helical structure of the chiral smectic C liquid crystal 15, thus resulting in bistable alignment states of the liquid crystal 15. The small spacing is held by spacer beads 16 of, e.g., silica or alumina, dispersed between the substrates. The thus-formed cell structure is sandwiched between a pair of polarizers 17a and 17b to provide a liquid crystal device.

A simple matrix-type display apparatus using a liquid crystal device comprising a ferroelectric liquid crystal disposed between a pair of substrates as described above may be driven by driving methods as disclosed by, e.g., JP-A 59-193426, JP-A 59-193427, JP-A 60-156046 and JP-A 60-156047.

Figure 4:
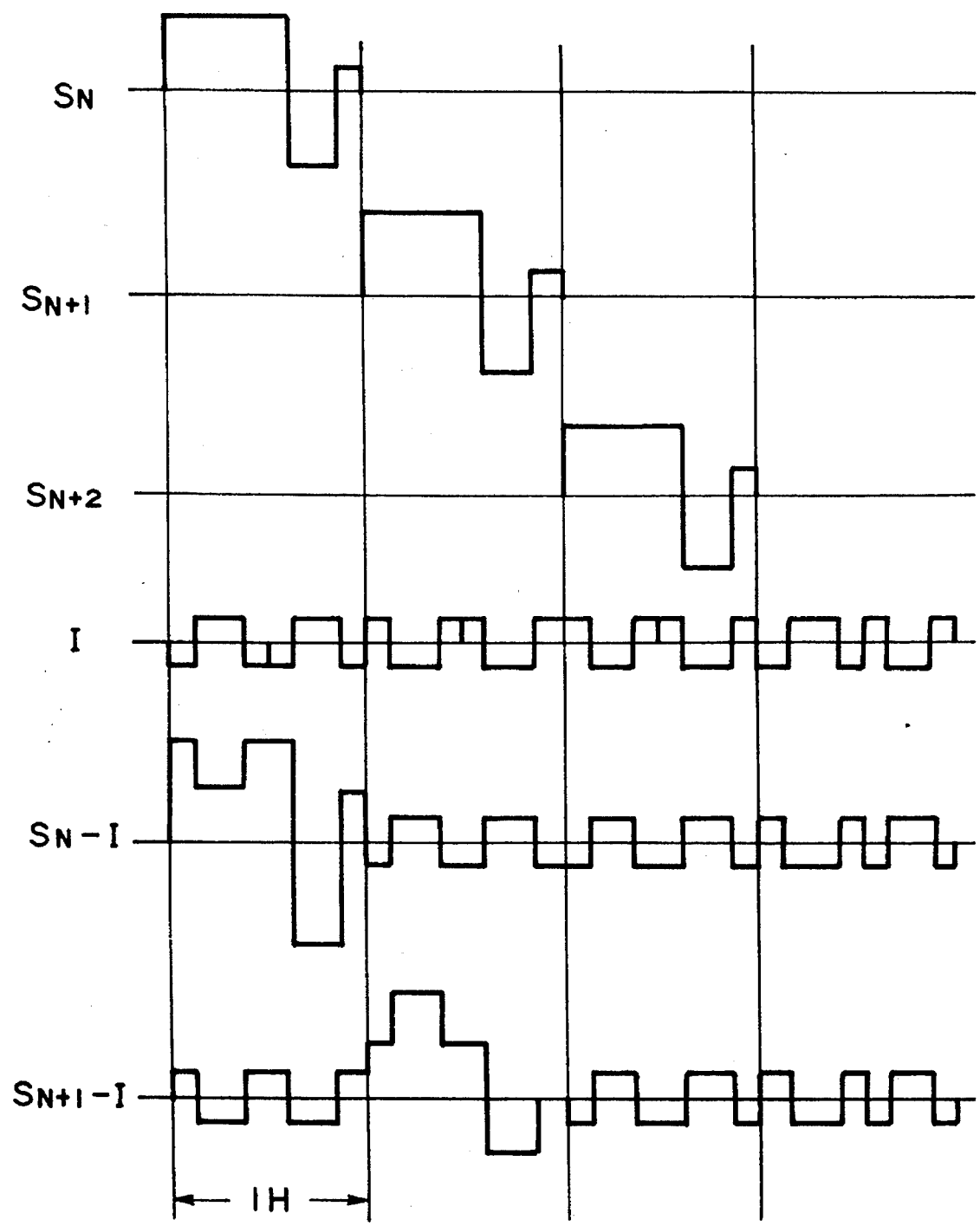
FIG. 4 is a waveform diagram illustrating driving waveforms used in an embodiment of the present invention.
Figure 5:
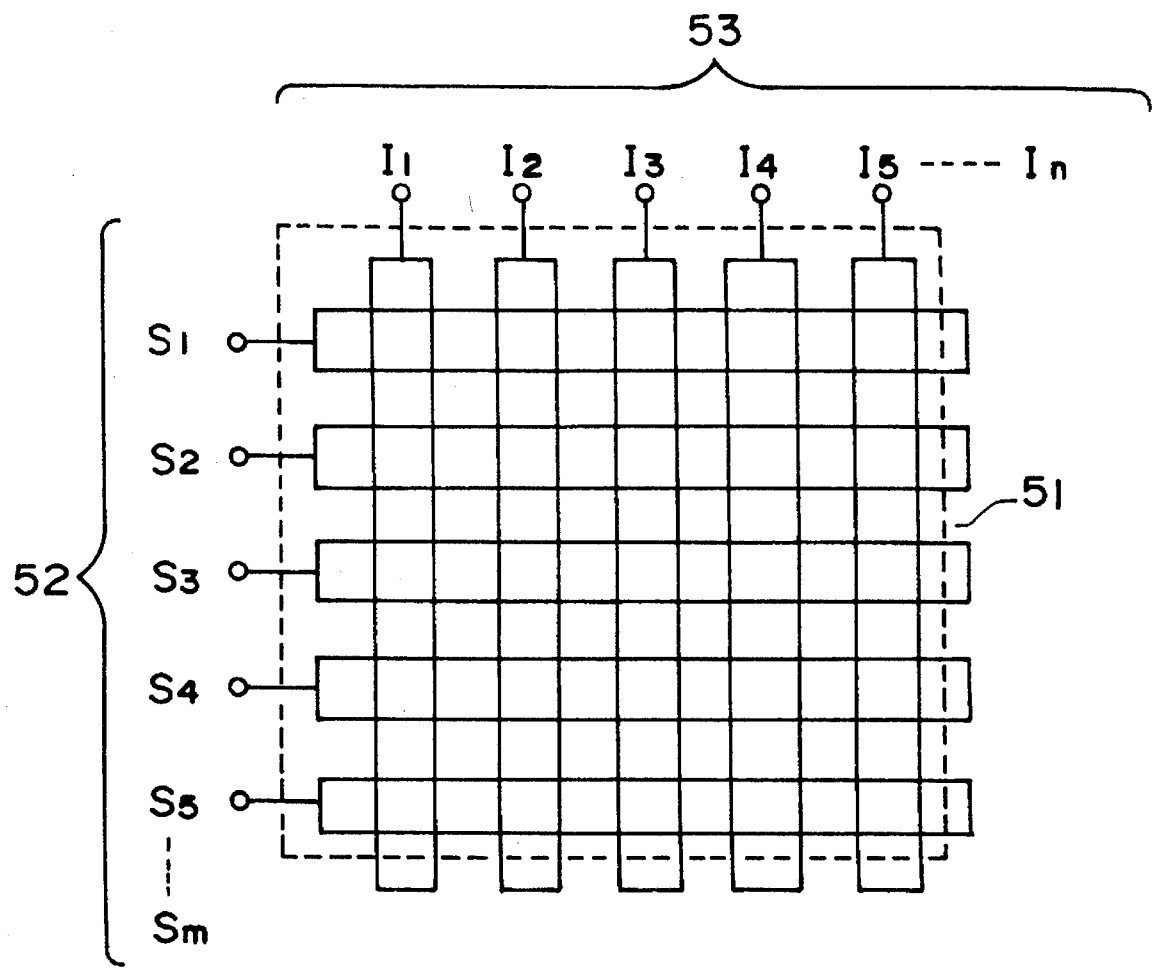
FIG. 5 is a plan view of an electrode matrix.

FIG. 4 is a waveform diagram showing an example set of driving waveforms used in such a driving method. FIG. 5 is a plan view showing an electrode matrix used in a ferroelectric liquid crystal panel 51 of a simple matrix-type. The liquid crystal panel 51 shown in FIG. 5 includes scanning electrodes 52 and data electrodes 53 intersecting each other so as to constitute a pixel at each intersection together with a ferroelectric liquid crystal disposed between the scanning electrodes 52 and data electrodes 53.

Figure 6:
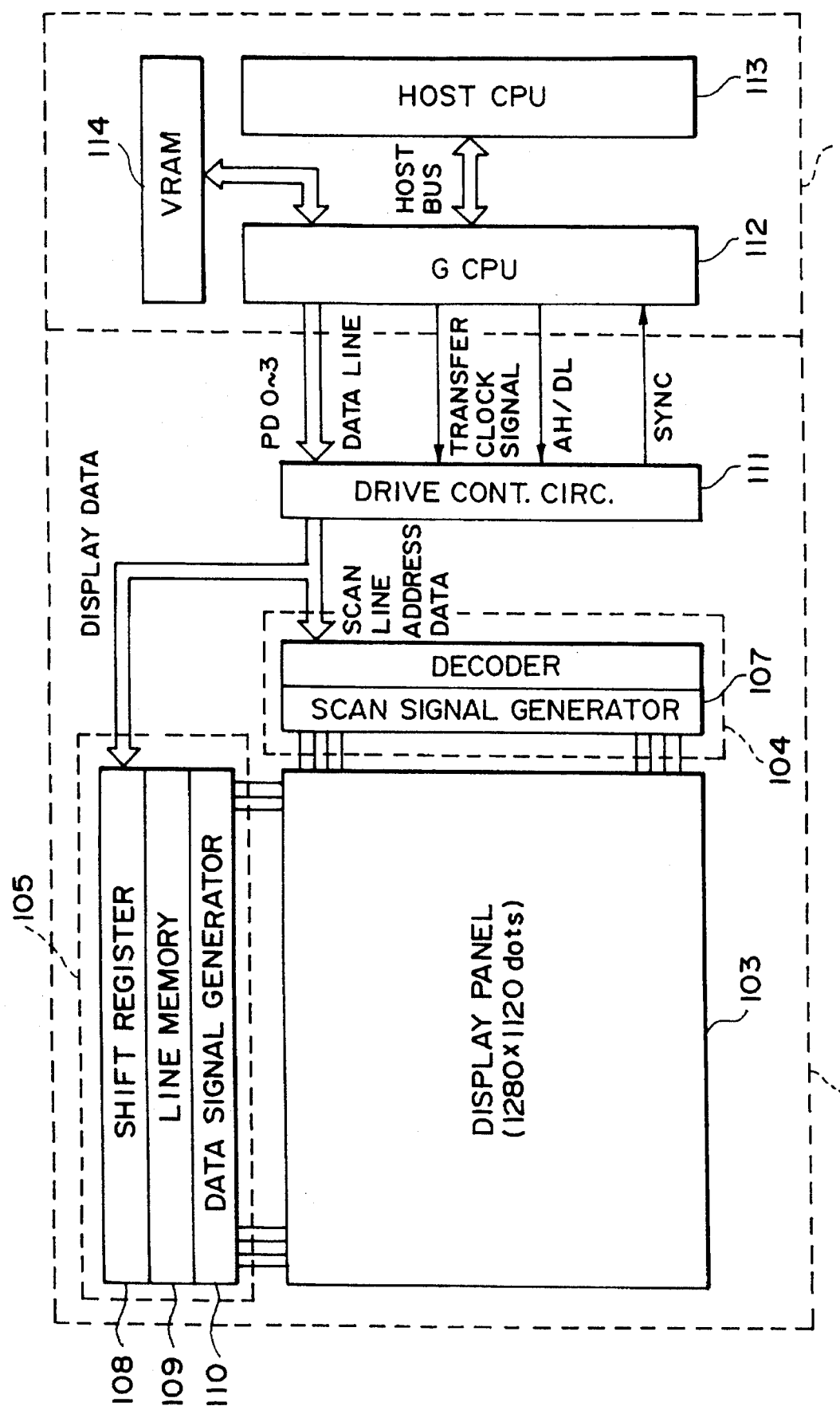
FIG. 6 is a block diagram of a liquid crystal display apparatus and a graphic controller.
Figure 7:
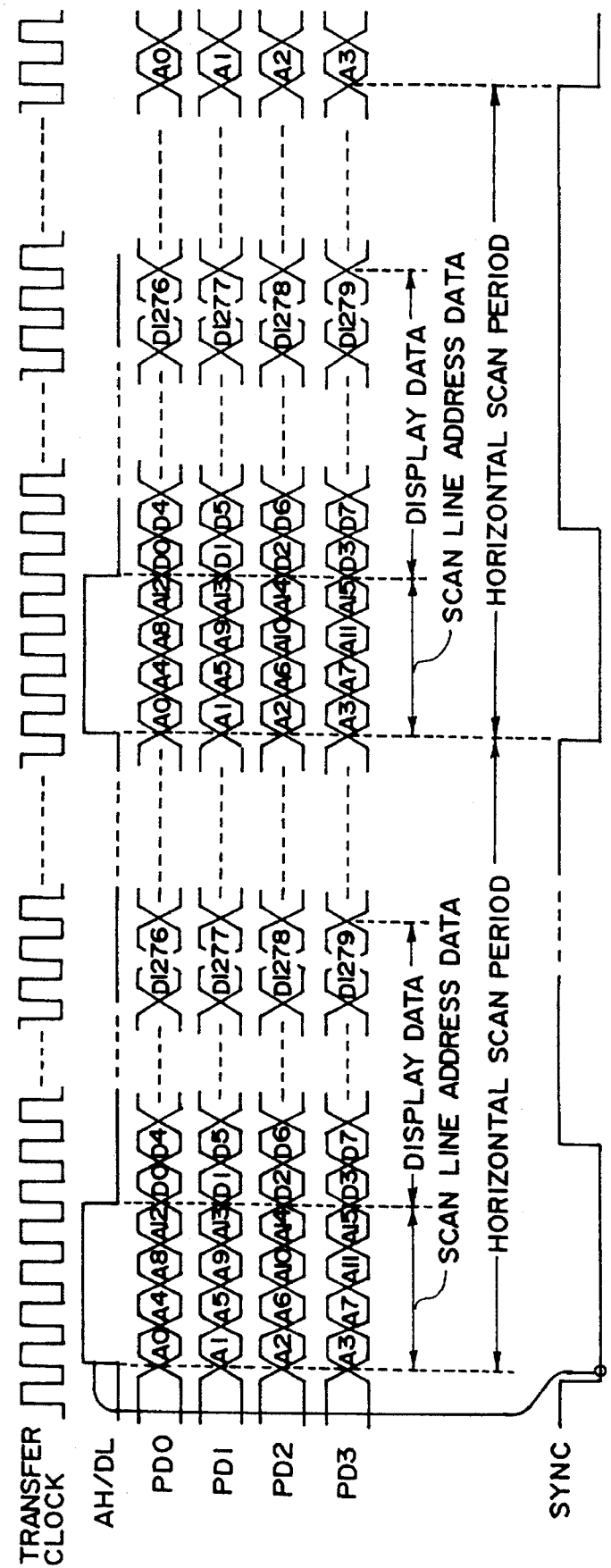
FIG. 7 is a time chart showing time correlation for image data communication between the liquid crystal display apparatus and the graphic controller.

A liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 6 and 7.

Referring to FIG. 6, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to the display panel 103 (illuminated with a backlight (not shown)) by signal transfer means shown in FIGS. 6 and 7. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102. Incidentally, a light source is disposed at the back of the display panel 103.

The values of cone angle Ⓗ, apparent tilt angle θa, liquid crystal layer inclination angle δ and pretilt angle α referred to herein are based on values measured according to the following methods.

Measurement of Cone Angle Ⓗ

An liquid crystal device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle Ⓗ was measured as a half of the angle between the first and second extinct positions.

Measurement of Apparent Tilt Angle θa

An liquid crystal device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the liquid crystal device was supplied with a single pulse of the opposite polarity exceeding the threshold voltage of the ferroelectric liquid crystal and was then rotated under no electric field relative to the polarizers to find a second extinct position. An apparent tilt angle θa was measured as a half of the angle between the first and second extinct positions.

Measurement of Liquid Crystal Layer Inclination Angle δ

The method used was basically similar to the method used by Clark and Largerwal (Japanese Display '86, Sep. 30–Oct. 2, 1986, p.p. 456–458) or the method of Ohuchi et al (J.J.A.P., 27 (5) (1988), p.p. 725–728). The measurement was performed by using a rotary cathode-type X-ray diffraction apparatus (available from MAC Science), and 80 μm-thick microsheets (available from Corning Glass Works) were used as the substrates so as to minimize the X-ray absorption with the glass substrates of the liquid crystal cells.

Measurement of pretilt angle α

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

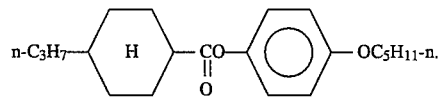

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

The chiral smectic liquid crystal used in the present invention comprises at least one mesomorphic compounds, preferably a liquid crystal composition comprising at least two mesomorphic compounds.

Examples of the mesomorphic compound may include those represented by the following structural formulae.

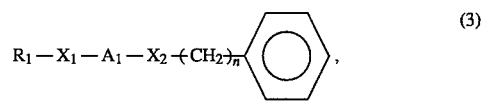

(3)

wherein $R_1$ denotes a linear or branched alkyl group having 1–18 carbon atoms; $X_1$ denotes a single bond, —O—, —COO— or —OCO—; $X_2$ denotes a single bond, —OCH$_2$—, —COO— or —OCO—; n is an integer of 3–16; and $A_1$ denotes

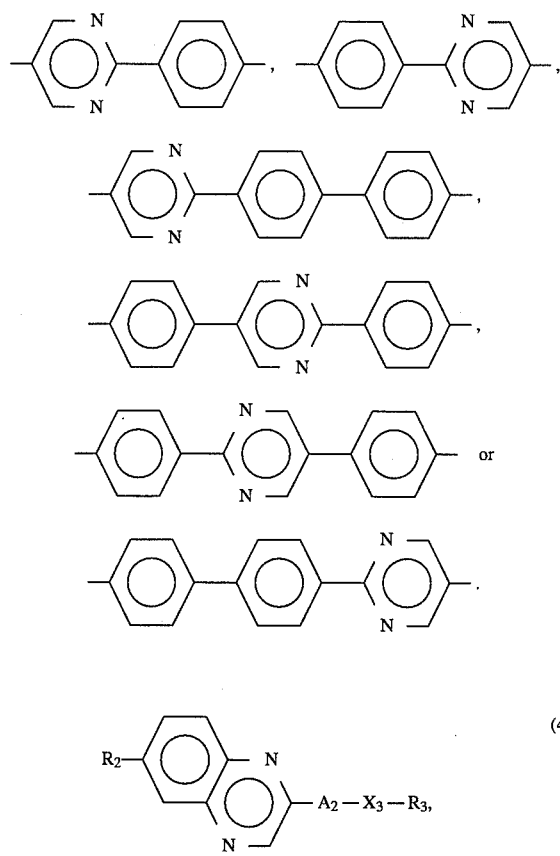

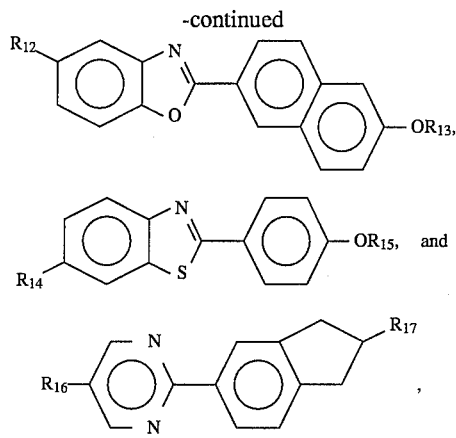

wherein $R_4$ to $R_{17}$ independently denote a linear or branched alkyl group capable of having a substituent such as fluorine (optically active or inactive).

The chiral smectic liquid crystal used in the present invention may preferably be a liquid crystal composition comprising at least one mesomorphic compound of the formula (3) and at least one mesomorphic compound of the formula (4). In this instance, the liquid crystal composition may preferably contain 1–30 wt. % in total of the mesomorphic compound of the formula (3) and 1–30 wt. % in total of the mesomorphic compound of the formula (4).

Specific examples of the mesomorphic compound of the formula (3) may include those shown in Table 1 below. In Table 1, the respective abbreviations denotes the following alkyl groups or aromatic groups.

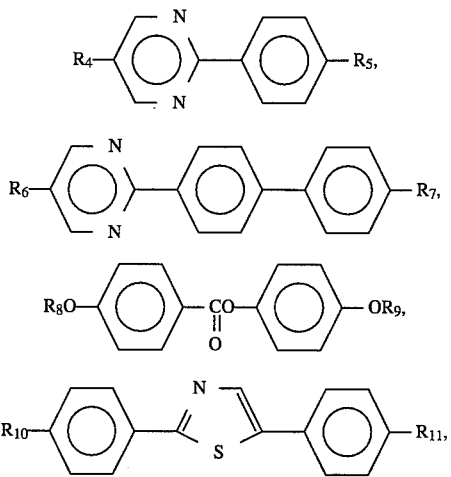

wherein $R_2$ and $R_3$ independently denote a linear or branched alkyl group having 1–18 carbon atoms; $X_3$ denotes a single bond, —O—, —OCO—, or —COO—; and $A_2$ denotes

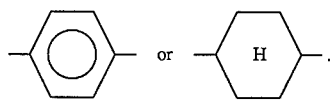

met = $CH_3$, hep = $C_7H_{15}$, trd = $C_{13}H_{27}$, eth = $C_2H_5$, oct = $C_8H_{17}$, tet = $C_{14}H_{29}$, pro = $C_3H_7$, non = $C_9H_{19}$, ped = $C_{15}H_{31}$, but = $C_4H_9$, dec = $C_{10}H_{21}$, hexd = $C_{16}H_{33}$, pen = $C_5H_{11}$, und = $C_{11}H_{23}$, hepd = $C_{17}H_{35}$, hex = $C_6H_{13}$, dod = $C_{12}H_{25}$, ocd = $C_{18}H_{37}$, 2mb = 2-methyl-butyl,

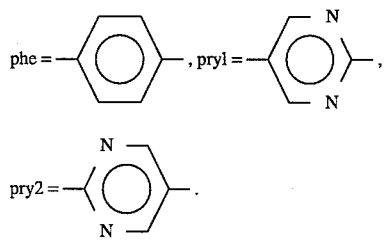

TABLE 1

| $R_1$ | $X_1$ | $A_1$ | $X_2$ | n |
|---|---|---|---|---|
| met | — | —pryl—phe— | — | 3 |
| but | — | —pryl—phe— | — | 3 |

TABLE 1-continued $$R_1-X_1-A_1-X_2-(CH_2)_n-\underset{}{\bigcirc} \quad (3)$$

| $R_1$ | $X_1$ | $A_1$ | $X_2$ | n |
|---|---|---|---|---|
| hex | — | —pry1—phe— | — | 4 |
| oct | — | —pry1—phe— | — | 4 |
| dec | — | —pry1—phe— | — | 4 |
| und | — | —pry1—phe— | — | 4 |
| dod | — | —pry1—phe— | — | 4 |
| tet | — | —pry1—phe— | — | 4 |
| ocd | — | —pry1—phe— | — | 4 |
| oct | —O— | —pry1—phe— | — | 4 |
| dec | —O— | —pry1—phe— | — | 4 |
| tet | —O— | —pry1—phe— | — | 4 |
| oct | — | —phe—pry2— | —OCH$_2$— | 3 |
| dec | — | —phe—pry2— | —OCH$_2$— | 4 |
| dod | — | —phe—pry2— | —OCH$_2$— | 6 |
| dec | —COO— | —phe—pry2— | — | 5 |
| dec | —OOC— | —phe—pry2— | —OCH$_2$— | 4 |
| dec | — | —pry1—phe— | —COO— | 5 |
| dec | — | —pry1—phe— | —OOC— | 4 |
| dec | — | —pry1—phe— | — | 10 |
| hex | — | —pry1—phe— | — | 14 |
| oct | — | —pry1—phe— | — | 16 |
| oct | — | —pry1—phe—phe— | — | 4 |
| hex | — | —phe—pry1—phe— | — | 5 |
| oct | — | —phe—pry2—phe— | — | 3 |
| dec | — | —phe—phe—pry2— | — | 4 |
| dec | — | —pry1—phe—phe— | —OCH$_2$— | 5 |
| hep | —OOC— | —phe—phe—pry2— | — | 5 |
| 2mb | — | —pry1—phe— | — | 5 |

Specific examples of the mesomorphic compound of the formula (4) may include those shown in Table 1 below. In Table 1, the respective abbreviations denotes the following alkyl groups or aromatic groups.

met = CH$_3$, hep = C$_7$H$_{15}$, trd = C$_{13}$H$_{27}$, eth = C$_2$H$_5$, oct = C$_8$H$_{17}$, tet = C$_{14}$H$_{29}$, pro = C$_3$H$_7$, non = C$_9$H$_{19}$, ped = C$_{15}$H$_{31}$, but = C$_4$H$_9$, dec = C$_{10}$H$_{21}$, hexd = C$_{16}$H$_{33}$, pen = C$_5$H$_{11}$, und = C$_{11}$H$_{23}$, hepd = C$_{17}$H$_{35}$, hex = C$_6$H$_{13}$, dod = C$_{12}$H$_{25}$, ocd = C$_{18}$H$_{37}$, 2mb = 2-methyl-butyl,

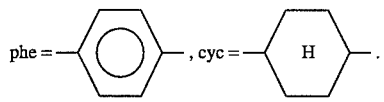

TABLE 2

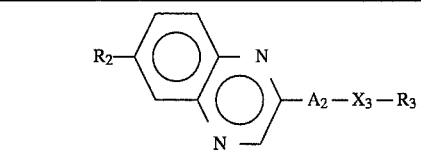

| $R_2$— | —$A_2$— | —$X_3$— | —$R_3$ |
|---|---|---|---|
| met— | —phe— | — | —but |
| pro— | —phe— | — | —hex |
| hex— | —phe— | — | —oct |

TABLE 2-continued

| $R_2$— | —$A_2$— | —$X_3$— | —$R_3$ |
|---|---|---|---|
| oct— | —phe— | — | —oct |
| dec— | —phe— | — | —oct |
| und— | —phe— | — | —dec |
| dod— | —phe— | — | —dec |
| tet— | —phe— | — | —dec |
| ocd— | —phe— | — | —dec |
| dec— | —phe— | — | —dec |
| oct— | —phe— | — | —dec |
| hex— | —phe— | —O— | —dec |
| oct— | —phe— | —O— | —dec |
| dec— | —phe— | —O— | —dec |
| hex— | —phe— | — | —dec |
| oct— | —phe— | — | —dod |
| oct— | —phe— | — | —ocd |
| hex— | —phe— | —COO— | —oct |
| oct— | —phe— | —COO— | —oct |
| dec— | —phe— | —COO— | —oct |
| hex— | —phe— | —OOC— | —oct |
| oct— | —phe— | —OOC— | —oct |
| dec— | —phe— | —OOC— | —oct |
| hex— | —cyc— | — | —und |
| oct— | —cyc— | — | —und |
| dec— | —cyc— | — | —dod |
| dod— | —cyc— | — | —dod |
| 2mb— | —phe— | — | —oct |
| oct— | —phe— | —O— | —2mb |

Hereinbelow, the present invention will be described more specifically based on Examples to which the present invention is not intended to be limited, however. In the Examples, "part(s)" used for describing compositions are all by weight.

Examples 1-1 to 3-5, Comparative Examples 1-1 to 3-2

Two 1.1 mm-thick glass plates (diagonal distance: 14 in.) were provided as a pair of substrates and were respectively coated with transparent ITO stripe electrodes each having a side metal wire of molybdenum, followed by coating with a 1500 Å-thick tantalum oxide as a transparent dielectric film by sputtering.

A solution in NMP of a polyimide precursor ("LQ 1802" mfd. by Hitachi Kasei K.K. or "LP-64" mfd. by Toray K.K.) was applied onto the tantalum oxide film and baked at 200°–270° C. (200° C. for LP-64, 270° C. for LQ-1802) to form a 100–300 Å-thick (100Å for LP-64, 300Å for LQ-1802) polyimide alignment film. The baked film was then rubbed with acetate fiber planted cloth. A pretilt angle is controlled by, e.g., changing rubbing conditions including a degree of pressing, rotation speed of a rubbing roller and a substrate feed velocity. Then, on one of the substrates, epoxy resin adhesive particles having an average particle size of 5.5 μm ("Torepearl" (trade name), available from Toray K.K.) were dispersed at a density of 50 particles/mm$^2$ by the Nord Son electrostatic dispersion method and, on the other substrate, silica micro-beads having an average particle size of 1.2 μm were dispersed at a density of 300 particles/mm$^2$ by the Knudsen electrostatic dispersion method. Then, a liquid adhesive ("Struct Bond" (trade name), mfd. by Mitsui Toatsu Kagaku K.K.) as a sealing member was applied by printing in a thickness of 6 μm. Then, the two glass plates were applied to each other so that their rubbed directions extended generally in the same direction but intersected each other at a counterclockwise angle of 0–10 degrees, and bonded to each other by applying a pressure of 2.8 kg/cm² at 70° C. for 5 min, followed by further curing of the two types of adhesives under a pressure of 0.63 kg/cm³ at 150° C. for 4 hours to form a blank cell.

Then, blank cells prepared in the above described manner were respectively evacuated to a reduced pressure of $10^{-4}$ torr and then filled with liquid crystal compositions A–H, a ferroelectric liquid crystal (ZLI-3233", mfd. by Merk Co.), a ferroelectric liquid crystal ("CS-1014", mfd. by Chisso K.K.), respectively, to prepare liquid crystal devices. The liquid crystal compositions A–H were prepared by mixing mesomorphic compounds in prescribed proportions, respectively. For instance, the liquid crystal compositions G and H were prepared by mixing the following mesomorphic compounds in the indicated proportions below.

| Composition G | |
|---|---|
| Structural formula | wt. parts |
| $C_7H_{15}$–[pyrazine]–[phenyl]–[phenyl]–$C_5H_{11}$ | 8 |
| $C_6H_{13}$–[pyrazine]–[phenyl]–[phenyl]–$C_8H_{17}$ | 12 |
| $C_6H_{13}$–[phenyl]–[thiazole]–[phenyl]–$OCC_6H_{13}$ (C=O) | 2 |
| $C_6H_{13}$–[phenyl]–[thiazole]–[phenyl]–$OCC_8H_{17}$ (C=O) | 6 |
| $C_6H_{13}$–[benzothiazole]–[phenyl]–$OC_8H_{17}$ | 2 |
| $C_{11}H_{23}$–[pyrazine]–[phenyl]–$OC$(=O)–[thiophene]–$C_4H_9$ | 10 |
| $C_6H_{13}$–[phenyl]–[thiazole]–[phenyl]–$C_9H_{19}$ | 9 |
| $C_{12}H_{25}$–[pyrazine]–[phenyl]–$OC$(=O)–[phenyl]–F | 4 |

-continued

| Composition G | |
|---|---|
| Structural formula | wt. parts |
| $C_{11}H_{23}$–[pyrazine]–[phenyl]–$OC$(=O)–[phenyl]–F, F | 2 |
| $C_{10}H_{21}$–[pyrazine]–[phenyl]–$OCH_2\overset{*}{C}HC_8H_{17}$ (F) | 5 |
| $C_{10}H_{21}$–[pyrazine]–[phenyl]–$OCH_2\overset{*}{C}HC_6H_{13}$ (F) | 5 |
| $C_{13}H_{27}$–[pyrazine]–[phenyl]–$OC$(=O)–[phenyl]–F | 2 |
| $C_8H_{17}$–[pyrazine]–[phenyl]–$OC_{10}H_{21}$ | 10 |
| $C_7H_{15}$–[pyrazine]–[phenyl]–$OC_9H_{19}$ | 2 |
| $C_9H_{19}$–[pyrazine]–[phenyl]–$OC_6H_{13}$ | 6 |
| $C_{10}H_{21}$–[pyrazine]–[phenyl]–$OC_8H_{17}$ | 5 |
| $C_{10}H_{21}$–O–[pyrazine]–[phenyl]–$(CH_2)_4$–[phenyl] | 7 |
| $C_8H_{18}$–[quinoline]–[phenyl]–$C_8H_{17}$ | 3 |

Each of the liquid crystal compositions A–H and the ferroelectric liquid crystals (ZLI-3233 and CS-1014) was cooled to 30° C. providing chiral smectic C phase through phases including cholesteric phase and smectic A phase or smectic A phase.

The liquid crystal compositions A–H and the ferroelectric liquid crystals showed the following properties including phase transition temperatures TpT (° C.), spontaneous polarization Ps (nC/cm²) at 30° C., cone angle ⒽH (degrees) at 30° C., and inclination angle δ (degrees) of a liquid crystal layer at various temperatures. The properties of TpT, Ps and ⒽH were shown in Table 3 below and the properties of δ were shown in Table 4 below, respectively.

TABLE 3

| Liquid Crystal | $T_{PT}$ (°C.) Cry | Sc* | $S_A$ | Ch | Iso | Ps (nC/cm²) (30° C.) | θ (degrees) (30° C.) |
|---|---|---|---|---|---|---|---|
| A | −9.5 / −22.0 | ← 53.5 → | ← 75.8 → | ← 82.0 → | | 5.8 | 14.5 |
| B | −10.4 / −14.7 | ← 66.4 → | ← 84.6 → | ← 90.9 → | | 5.8 | 14.9 |
| C | −9.9 / −20.6 | ← 65.2 → | ← 86.3 → | ← 95.8 → | | 6.1 | 16.0 |
| D | −8.5 / −22.4 | ← 68.1 → | ← 91.6 → | ← 100.2 → | | 6.1 | 14.9 |
| E | −17.1 / −20.3 | ← 69.8 → | ← 95.0 → | ← 103.1 → | | 7.5 | 15.5 |
| F | 6.4 / −8.1 | ← 57.0 → | ← 105.0 → | ← 122.5 → | | 3.4 | 14.1 |
| G | −16.2 / −23.5 | ← 73.1 → | ← 94.8 → | ← 102.5 → | | 5.6 | 14.3 |
| H | −14.3 / −19.8 | ← 66.2 → | ← 88.4 → | ← 94.0 → | | 5.8 | 15.7 |
| ZLI-3233 | −15 | ← 72 → | ← 78 → | ← 90 → | | 9.9 | 29.0 |
| CS-1014 | −13 | ← 54.0 → | ← 69.1 → | ← 80.5 → | | 4.7 | 21.0 |

Cry: Crystal or higher-order smectic phase
Sc*: Chiral smectic C phase
$S_A$: Smectic A phase
Ch: Cholesteric phase
Iso: Isotropic phase

TABLE 4

| L.C. | Layer inclination angle δ (deg.) | | | | | | |
|---|---|---|---|---|---|---|---|
| | −10° C. | 0° C. | 10° C. | 20° C. | 30° C. | 40° C. | 50° C. |
| A | — | 6.1 | 8.9 | 10.3 | 10.4 | 8.7 | — |
| B | — | — | 6.2 | 8.9 | 10.0 | 10.5 | 9.7 |
| C | 5.4 | 8.5 | 11.0 | 12.2 | 12.8 | 12.6 | 11.4 |
| D | 1.4 | 5.9 | 8.1 | 9.6 | 10.2 | 10.3 | 9.6 |
| E | 4.6 | 7.3 | 8.8 | 10.0 | 10.7 | 10.7 | 10.0 |
| F | — | — | 12.4 | 12.5 | 12.3 | 11.4 | 9.6 |
| G | — | — | 4.8 | 7.8 | 9.3 | 9.8 | 9.4 |
| H | — | 4.8 | 7.6 | 9.4 | 10.6 | 11.0 | 10.0 |
| ZLI-3233 | 29.1 | 28.7 | 28.4 | 27.8 | 27.0 | 25.7 | 23.9 |
| CS-1014 | 15.5 | 17.7 | 18.8 | 19.1 | 18.5 | 16.6 | 12.5 |

(Examples 1-1 to 1-7, Comparative Examples 1-1 to 1-3)

The above-prepared liquid crystal devices were subjected to a shock test at 0° C. by using a drop testing apparatus ("DT-50", mfd. by Toshida Seiki K.K.). More specifically, the shock test was performed by observing a change in an alignment state of a liquid crystal within a cell on condition of increasing an impact from 20 G to 80 G (G: acceleration of gravity=9.8 m/sec²) by an increment of 10 G.

The results of the shock test were shown in Table 5 below together with each cell structure (alignment film, pretilt angle α, intersection angle φ), apparent tilt angle θa, and quasi-$S_A$ state appearing temperature.

TABLE 5

| | L.C. | Cell structure | | | | Appearing temp. | |
| --- | --- | --- | --- | --- | --- | --- | --- |
| | | Alignment film | α (deg.) | φ*1 (deg.) | θa at 30° C. (deg.) | of quasi-$S_A$ (°C.) | Shock test*2 (at 0° C.) |
| Ex. No. | | | | | | | |
| 1-1 | B | LQ-1802 | 16 | 8 | 10 | 1 | 80G |
| 1-2 | B | " | 20 | 10 | 11 | 2 | " |
| 1-3 | A | " | 17 | 6 | 11 | −4 | " |
| 1-4 | E | " | 16 | 8 | 12 | −10 | 70G 80G det. |
| 1-5 | E | " | 14 | 4 | 12 | −11 | 70G 80G det. |
| 1-6 | G | " | 17 | 10 | 11 | 3 | 80G |
| 1-7 | H | " | 21 | 8 | 12 | −11 | 70G 80G det. |
| Comp. Ex. | | | | | | | |
| 1-1 | F | " | 16 | 8 | 13 | Not appeared | 50G det. |
| 1-2 | ZLI-3233 | " | 14 | 4 | 6 | " | 30G det. |
| 1-3 | CS-1014 | " | 20 | 10 | 15 | " | 40G det. |

*1: Cell intersection angle.
*2: For example, "80G" means that an alignment state is not changed under an impact of 80G, and "80G det." means that an alignment state is changed and disordered (i.e., deteriorated) to cause a sanded texture or to cause a sanded texture and zigzag defects.

As apparent from the above results, the liquid crystal devices (Ex. 1-1 to 1-7) comprising the liquid crystal composition showing a quasi-smectic A alignment state on a lower temperature side (e.g., −11° C. to 3° C.) within chiral smectic C phase range provided a good shock resistance at 0° C. compared with those (Comp. Ex. 1-1 to 1-3) comprising the liquid crystal composition not showing a quasi-smectic A alignment state.

Then, each of the liquid crystal devices was cooled to −20° C. and kept at −20° C. for 100 hours, and then subjected to observation of an alignment state. As a result, the liquid crystal devices according to the present invention used in Examples 1-1 to 1-7 caused substantially no change in the alignment state. On the other hand, the liquid crystal devices used in Comparative Examples 1-1 to 1-3 (i.e., not showing quasi-$S_A$ state) showed a considerable disorder of the alignment state being attributable to crystallization. Accordingly, the liquid crystal devices providing quasi-$S_A$ state improved low-temperature storage properties when compared with those failing to provide quasi-$S_A$ state. (Examples 2-1 to 2-7, Comparative Examples 2-1 and 2-2)

Nine liquid crystal devices were prepared in the above-mentioned manner and evaluated in the same manner as in the above examples except for changing a test temperature to −5° C.

The results are shown in the following Table 6.

TABLE 6

| | L.C. | Cell structure | | | | Appearing temp. | |
| --- | --- | --- | --- | --- | --- | --- | --- |
| | | Alignment film | α (deg.) | φ*1 (deg.) | θa at 30° C. (deg.) | of quasi-$S_A$ (°C.) | Shock test*2 (at −5° C.) |
| Ex. No. | | | | | | | |
| 2-1 | A | LQ-1802 | 20 | 10 | 12 | −3 | 80G |
| 2-2 | B | " | 20 | 10 | 11 | 2 | " |
| 2-3 | C | " | 16 | 8 | 11 | −12 | 70G 80G det. |
| 2-4 | D | " | 15 | 0 | 12 | −10 | 80G |
| 2-5 | D | " | 18 | 4 | 13 | −9 | 70G 80G det. |
| 2-6 | G | " | 19 | 6 | 12 | 3 | 80G |
| 2-7 | H | " | 17 | 6 | 12 | −12 | " |
| Comp. Ex. | | | | | | | |
| 2-1 | F | " | 17 | 8 | 13 | Not appeared | 50G det. |
| 2-2 | CS-1014 | " | 20 | 10 | 15 | " | 40G det. |

*1: Cell intersection angle.
*2: For example, "80G" means that an alignment state is not changed under an impact of 80G, and "80G det." means that an alignment state is changed and disordered (i.e., deteriorated) to cause a sanded texture or to cause a sanded texture and zigzag defects.

As apparent from the above results, the liquid crystal devices providing quasi-$S_A$ state according to the present invention stably showed a good shock resistance when compared with those failing to provide quasi-$S_A$ state.

(Examples 3-1 to 3-5, Comparative Examples 3-1 and 3-2)

Seven liquid crystal devices were prepared in the above-mentioned manner and evaluated in the same manner as in the above examples 2-1 to 2-7 except for changing the alignment film "LQ-1802" to an alignment film "LP-64".

The results are shown in the following Table 7.

TABLE 7

|  | L.C. | Cell structure | | | θa at 30° C. (deg.) | Appearing temp. of quasi-$S_A$ (°C.) | Shock test[*2] (at −5° C.) |
| --- | --- | --- | --- | --- | --- | --- | --- |
|  |  | Alignment film | α (deg.) | φ[*1] (deg.) |  |  |  |
| Ex. No. |  |  |  |  |  |  |  |
| 3-1 | A | LP-64 | 2 | 0 | 6 | −6 | 70G 80G det. |
| 3-2 | B | " | " | 0 | 6 | −1 | 80G |
| 3-3 | D | " | " | 1 | 7 | −12 | 70G 80G det. |
| 3-4 | G | " | " | 0 | 8 | 0 | 80G |
| 3-5 | H | " | " | 0 | 8 | −13 | 60G 70G det. |
| Comp. Ex. |  |  |  |  |  |  |  |
| 3-1 | C | " | " | 0 | 7 | Not appeared | 40G det. |
| 3-2 | ZLI-3233 | " | " | 2 | 8 | " | 30G det. |

[*1]: Cell intersection angle.
[*2]: For example, "80G" means that an alignment state is not changed under an impact of 80G, and "80G det." means that an alignment state is changed and disordered (i.e., deteriorated) to cause a sanded texture or to cause a sanded texture and zigzag defects.

As apparent from the above results, the liquid crystal devices (Ex. 3-1 to 3-5) comprising the liquid crystal composition showing a quasi-smectic A alignment state on a lower temperature side (e.g., −13° C. to 0° C.) within chiral smectic C phase range provided a good shock resistance at −5° C. compared with those (Comp. Ex. 3-1 to 3-2) comprising the liquid crystal composition not showing a quasi-smectic A alignment state.

As described hereinabove, according to the present invention, there is provided a liquid crystal device comprising a chiral smecticliquid crystal characterized by showing a quasi-smectic A alignment state (i.e., having a single average molecular axis) on a lower temperature side of chiral smectic C phase range when observed through cross nicol polarizers under no voltage application. Such a liquid crystal device provided a good shock resistance and low-temperature storage properties.

What is claimed is:

1. A liquid crystal device, comprising: a pair of substrates and a chiral smectic liquid crystal disposed between the pair of substrates, each of the pair of substrates having thereon an electrode for applying a voltage to the liquid crystal, the pair of substrates being provided with respective uniaxial alignment axes extending in directions which are parallel to each other or intersect each other at a prescribed angle, wherein the chiral smectic liquid crystal is placed in an alignment state in which the liquid crystal molecules have a single average molecular axis substantially aligned with a central axis direction of the uniaxial alignment axes under no electric field application within the lower half of the temperature range giving chiral smectic C phase, wherein the single average molecular axis provides the darkest observable state through cross nicol polarizers.

2. A device according to claim 1, wherein the chiral smectic liquid crystal is placed in an alignment state in which the liquid crystal assumes at least two stable states, said liquid crystal providing at about room temperature a pretilt angle α, a cone angle Ⓗ, an inclination angle δ of the liquid crystal layer, and an apparent tilt angle θa satisfying:

$$Ⓗ < α + δ, \quad δ < α, \text{ and}$$

$$Ⓗ > θa > Ⓗ/2.$$

3. A device according to any one of claims 1 or 2, wherein the uniaxial alignment axes extend in directions which intersect at an angle of 1–25 degrees.

4. A device according to claim 3, wherein the chiral smectic liquid crystal is placed in an alignment state in which the liquid crystal molecules have said single average molecular axis at about the maximum temperature giving chiral smectic C phase.

5. A device according to claim 4, wherein said pretilt angle α is at least 5 degrees.

6. A device according to claim 5, wherein the inclination angle δ increases upon temperature decrease down to a transition temperature giving a maximum of said inclination angle δ and decreases upon further temperature decrease below said transition temperature.

7. A device according to claim 6, wherein said transition temperature appears at a temperature of at least 10° C.

8. A device according to claim 6, wherein said transition temperature appears at a temperature of at least 25° C.

9. A device according to claim 8, wherein the chiral smectic liquid crystal comprises a liquid crystal composition, comprising:

at least one mesomorphic compound having the following formula (3):

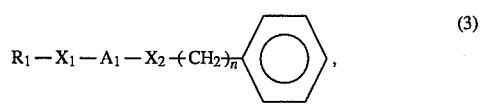

(3)

wherein $R_1$ denotes a linear or branched alkyl group having 1–18 carbon atoms; $X_1$ denotes a single bond, —O—, —COO— or —OCO—; $X_2$ denotes a single bond, —OCH$_2$—, —COO— or —OCO—; n is an integer of 3–16; and $A_1$ denotes

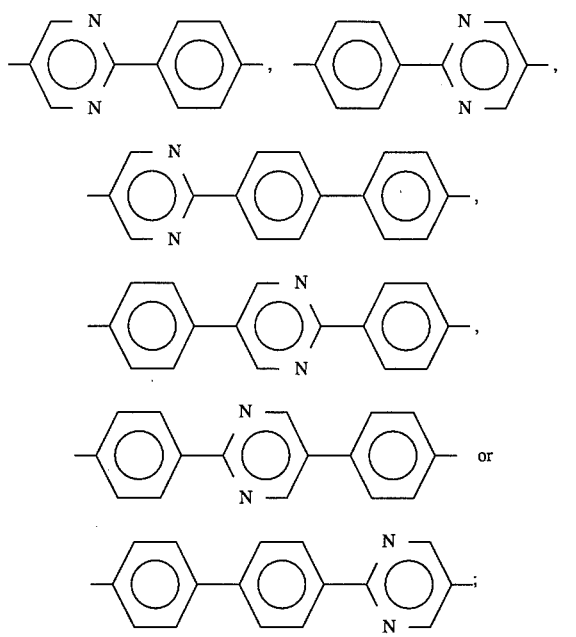

at least one mesomorphic compound having the following formula (4):

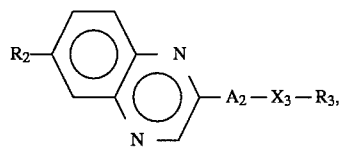

wherein $R_2$ and $R_3$ independently denote a linear or branched alkyl group having 1–18 carbon atoms; $X_3$ denotes a single bond, —O—, —OCO—, or —COO—; and $A_2$ denotes

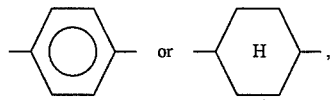

the liquid crystal composition comprising 1–30 wt. % in total of said mesomorphic compound of the formula (3) and 1–30 wt. % in total of said mesomorphic compound of the formula (4).

10. A liquid crystal display apparatus, comprising a liquid crystal device according to claim 9, a drive circuit for driving the liquid crystal device and a light source.

11. A device according to claim 10, wherein the chiral smectic liquid crystal is a liquid crystal composition, comprising:

at least one mesomorphic compound having the following formula (3):

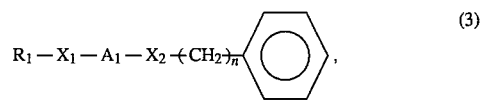

wherein $R_1$ denotes a linear or branched alkyl group having 1–18 carbon atoms; $X_1$ denotes a single bond, —O—, —COO— or —OCO—; $X_2$ denotes a single bond, —OCH$_2$—, —COO— or —OCO—; n is an integer of 3–16; and $A_1$ denotes

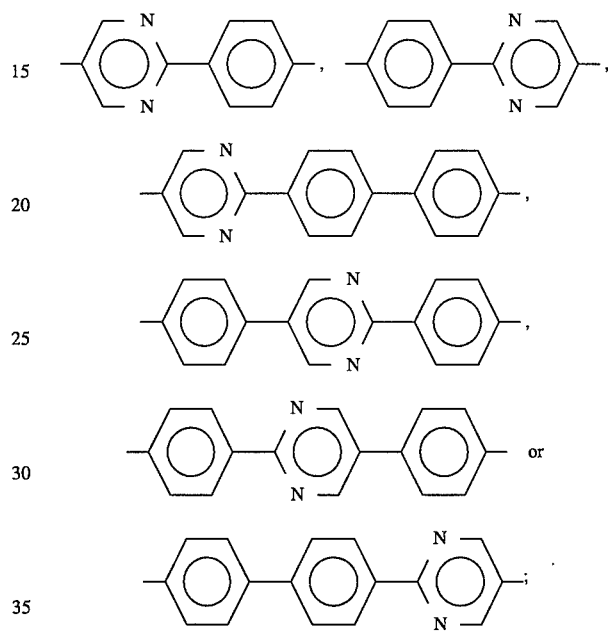

at least one mesomorphic compound having the following formula (4):

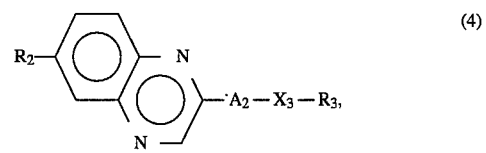

wherein $R_2$ and $R_3$ independently denote a linear or branched alkyl group having 1–18 carbon atoms; $X_3$ denotes a single bond, —O—, —OCO—, or —COO—; and $A_2$ denotes

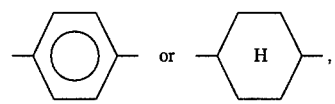

the liquid crystal composition comprising 1–30 wt. % in total of said mesomorphic compound of the formula (3) and 1–30 wt. % in total of said mesomorphic compound of the formula (4).

* * * * *

UNITED STATES PATENT AND TRADEMARK OFFICE
CERTIFICATE OF CORRECTION

PATENT NO. : 5,460,749
DATED : October 24, 1995
INVENTOR(S) : MASAHIRO TERADA, ET AL.

It is certified that error appears in the above-indentified patent and that said Letters Patent is hereby corrected as shown below:

COLUMN 1

Line 8, "of" should be deleted;

Line 62, " a a" should read --a--;

Line 65, "angle 9a" should read --angle $\theta$a--.

COLUMN 2

Line 40, "have" should read --has--;

Line 43, "angle a" should read --angle $\alpha$--.

COLUMN 3

Line 6, "a," should read --$\alpha$--.

COLUMN 4

Line 52, "an" should be deleted.

COLUMN 5

Line 37, "of at some temperatures illustrating a" should read --a--

Line 38, "charge of a layer structure" should read --change of layer structure at different temperatures--.

UNITED STATES PATENT AND TRADEMARK OFFICE
CERTIFICATE OF CORRECTION

PATENT NO. : 5,460,749

DATED : October 24, 1995

INVENTOR(S) : MASAHIRO TERADA, ET AL.

It is certified that error appears in the above-indentified patent and that said Letters Patent is hereby corrected as shown below:

COLUMN 6

Line 7, "angle 6" should read --angle $\delta$--;

Line 56, "angle a" should read --angle $\alpha$--.

COLUMN 7

Line 9, "to" should read --to be--;

Line 14, "to" should read --to be--.

COLUMN 9

Line 32, "An" should read --A--;

Line 45, "An" should read --A--;

Line 46, "polarizes" should read --polarizers--.

COLUMN 10

Line 51, "compounds," should read --compound,--.

COLUMN 12

Line 31, "denotes" should read --denote--.

UNITED STATES PATENT AND TRADEMARK OFFICE
CERTIFICATE OF CORRECTION

PATENT NO. : 5,460,479
DATED : October 24, 1995
INVENTOR(S) : MASAHIRO TERADA, ET AL.

It is certified that error appears in the above-indentified patent and that said Letters Patent is hereby corrected as shown below:

COLUMN 13

Line 34, "denotes" should read --denote--.

COLUMN 15

Line 15, "ZLI-3233"," should read --("ZLI-3233",-- and
"Merk Co.)," should read --Merck Co.),--.

COLUMN 18

Line 58, "$T_pT$", should read --$T_{PT}$--;

Line 62, "$T_pT$," should read --$T_{PT}$,--;

Line 63, "were" should read --are-- (both occurrences)

COLUMN 23

Line 41, "smecticliquid" should read --smectic liquid--.

COLUMN 24

Line 52, "comprises" should read --is--.

UNITED STATES PATENT AND TRADEMARK OFFICE
CERTIFICATE OF CORRECTION

PATENT NO. : 5,460,749
DATED : October 24, 1995
INVENTOR(S) :
    MASAHIRO TERADA, ET AL.

It is certified that error appears in the above-indentified patent and that said Letters Patent is hereby corrected as shown below:

COLUMN 25

Line 27, "at" should read --and at--.

COLUMN 26

Line 37, "at" should read --and at--.

Signed and Sealed this

Fourteenth Day of May, 1996

Attest:

BRUCE LEHMAN

Attesting Officer     Commissioner of Patents and Trademarks